(12) United States Patent
Kapur et al.

(10) Patent No.: US 8,615,442 B1
(45) Date of Patent: Dec. 24, 2013

(54) PERSONALIZED CONTENT DELIVERY SYSTEM

(75) Inventors: Amit R. Kapur, Marina Del Rey, CA (US); Steven F. Pearman, Redondo Beach, CA (US); James R. Benedetto, Hermosa Beach, CA (US)

(73) Assignee: Project Rover, Inc., Santa Monica, CA (US)

( * ) Notice: Subject to any disclaimer, the term of this patent is extended or adjusted under 35 U.S.C. 154(b) by 184 days.

(21) Appl. No.: 12/968,251

(22) Filed: Dec. 14, 2010

Related U.S. Application Data

(60) Provisional application No. 61/286,517, filed on Dec. 15, 2009.

(51) Int. Cl.
*G06Q 30/00* (2012.01)

(52) U.S. Cl.
USPC .......................................... 705/26.1; 705/27.1

(58) Field of Classification Search
USPC ............................................... 705/26.1, 27.1
See application file for complete search history.

(56) References Cited

U.S. PATENT DOCUMENTS

| 8,312,036 B2 * | 11/2012 | Chang et al. ................... 707/767 |
| 2005/0033771 A1 * | 2/2005 | Schmitter et al. ........... 707/104.1 |
| 2010/0280985 A1 * | 11/2010 | Duchon et al. ................... 706/52 |

OTHER PUBLICATIONS

Arrington, M., "Exclusive: Ex- MySpace Execs Launce Gravity Into Private Beta," TechCrunch, Dec. 16, 2009, 9 pages, [online] [retrieved on Jul. 16, 2013] Retrieved from the internet <URL:http://techcrunch.com/2009/12/16/exclusive-ex-myspace-execs-launch-gravity-into-private-beta/>.
Arrington, M., "Time to Meet Wavii, The Super Stealth, Super Awesome Startup Based In . . . Seattle?" TechCrunch, Jul. 21, 2010, 7 pages, [online] [retrieved on Jul. 16, 2013] Retrieved from the internet <URL:http://techcrunch.com/2010/07/21/time-to-meet-wavii-the-super-stealth-super-awesome-startup-based-in-seattle/>.
Audiencescience, "Audience Gateway for Advertisers—Drive Online Efficiency and Effectiveness, Targeted Web Advertising," 2010, 4 pages, [online] [Archived on webarchive.org on Oct. 23, 2010] [Retrieved on Jul. 22, 2013] Retrieved from the Internet <URL:http://web.archive.org/web/20101023142524/http://www.audiencescience.com/technology/ advertisers>.
Audiencescience, "The AudienceScience Targeting Segments™," 2009, 1 page, [online] [Archived on webarchive.org on Jun. 18, 2009] [Retrieved on Jul. 22, 2013] Retrieved from the Internet <URL:http://web.archive.org/web/20090618131511/http://www.audiencetargeting.com/>.
Bluekai, BlueKai Data Exchange, 2010, 1 page [online] [Archived on webarchive.org on Aug. 19, 2010] [retrieved on Jul. 16, 2013] Retrieved from the internet <URL:http://web.archive.org/web/20100819140734/http://www.bluekai.com/solutions.html>.

(Continued)

*Primary Examiner* — James Zurita

(74) *Attorney, Agent, or Firm* — Fenwick & West LLP

(57) ABSTRACT

A content delivery system for generating personalized content for a user. The system maintains an interest graph that shows the user's current attachment to one or more topics. When a user performs an action, a topic is determined for the action and the user's interest graph is modified based on the action. The system also receives content and analyzes the language of the content to determine a topic of the content. A similarity between the user's interests and the content is determined. The content is also analyzed to determine the popularity of the content. The user's interest level and the popularity of the content are then used to provide the user with a personalized content, such as a content recommendation or enhanced content.

18 Claims, 9 Drawing Sheets

(56) References Cited

OTHER PUBLICATIONS

Buzzfeed, Inc., "About BuzzFeed," 2009, 4 pages, [online] [Archived on webarchive.org on Dec. 16, 2009] [Retrieved on Jul. 16, 2013] Retrieved from the internet <URL:http://web.archive.org/web/20091216093131/http://www.buzzfeed.com/about>.
Chai Labs, Inc., "Semantic Search Platform—Chai Labs," 2010 2 pages, [online] [Archived on webarchive.org on Sep. 1, 2010] [retrieved on Jul. 16, 2013] Retrieved from the internet URL:http://web.archive.org/web/20100901163902/http://www.chailabs.com/platform>.
Collecta.Com, Webpage for Collecta.com, 1 page [online] [Archived on webarchive.org on Dec. 14, 2009] [retrieved on Jul. 22, 2013] Retrieved from the internet <URL:http://web.archive.org/web/20091214190516/http://collecta.com/#q=%22climate+chang%22>.
Daylife, "Daylife Overview," 5 pages, [online] [Archived on webarchive.org on Nov. 18, 2010] [Retrieved on Jul. 16, 2013] Retrieved from the internet <URL: http://web.archive.org/web/20101118023136/http://corp.daylife.com/overview/>.
Digg, Inc. "The Latest News Headlines, Videos and Images," Webpage for Digg.com, 2009, 3 pages, [online] [Archived on webarchive.org on Dec. 12, 2009] [Retrieved on Jul. 16, 2013] Retrieved from the internet <URL: http://web.archive.org/web/20091212215954/http://digg.com/>.
Ellerdale, Inc., "The Ellerdale Project—Products" Webpage for Ellerdale.com, 2 pages, [online] [Archived on webarchive.org on Jul. 25, 2010] [retrieved on Jul. 16, 2013] Retrieved from the internet <URL:http://web.archive.org/web/20100725150333/http://www.ellerdale.com/products.html>.
Exelate Media, "eXchange Behavioral Targeting Segments: 170M+ UV Strong," 2009, 1 Page, [online] [Archived on webarchive.org on Dec. 14, 2009] [retrieved on Jul. 22, 2013] Retrieved from the internet <URL:http://web.archive.org/web/20091214103616/http://www.exelate.com/new/buyers-targetingsegments.html>.
Flipboard Inc., "Flipboard for iPad," Webpage for Flipboard.com, 2010, 1 page, [online] [Archived on webarchive.org on Aug. 1, 2010] [Retrieved on Jul. 16, 2013] Retrieved from the internet <URL:http://web.archive.org/web/20100801114228/http://www.flipboard.com/>.
Hawthorne Labs, "Apollo—The newspaper of the future," 2010, 2 pages [online] [Archived on webarchive.org on Aug. 8, 2010] [Retrieved on Jul. 16, 2013] Retrieved from the internet <URL:http://http://web.archive.org/web/20100808230643/http://hawthornelabs.com/>.
Hunch Inc., "How Hunch Works," 2009, 2 pages, [online] [Archived on webarchive.org on Nov. 26, 2009] [Retrieved on Jul. 16, 2013] Retrieved from the internet <URL:http://web.archive.org/web/20091126173555/http://www.hunch.com/info/how-hunch-works/>.
Kirkpatrick, M., "Hunch Relaunches as Internet Personalization Service," Read Write Web, Aug. 4, 2010, 6 pages, [online] [retrieved on Jul. 16, 2013] Retrieved from the internet <URL:http://www.readwriteweb.com/archives/hunch_internet_personalization_service.php>.
Kirkpatrick, M., "MySpace Preparing to go Beyond Friends in your News Feed ," Read Write Web, Aug. 3, 2010, 5 pages, [online] [retrieved on Jul. 16, 2013] Retrieved from the internet <URL:http://www.readwriteweb.com/archives/myspace_preparing_to_put_celebrity_news_in_your_ne.php>.
LOUD3R, "LOUD3R Solutions," 2010, 2 pages [online] [Archived on webarchive.org on Aug. 17, 2010] [retrieved on Jul. 16, 2013] Retrieved from the internet <URL:http://web.archive.org/web/20100817062817/http://www.loud3r.com/solutions/>.
Mindset Media, LLC, Webpage for www.Mindset-Media.com, 2007-2009, 1 page, [online] [Archived on webarchive.org on Mar. 18, 2009] [Retrieved on Jul. 22, 2013] Retrieved from the internet <URL:http://web.archive.org/web/20090318212800/http://www.mindset-media.com/>.
Mspoke, Webpage for mSpoke.com, 2008, 2 pages [online] [Archived on webarchive.org on Dec. 8, 2009] [retrieved on Jul. 16, 2013] Retrieved from the internet <URL:http://web.archive.org/web/20091208055908/http://www.mspoke.com/engine.html>.
Mspoke, mSpoke Corporate Blog, 2009, 12 Pages, [online] [Archived on webarchive.org on Dec. 9, 2009] [retrieved on Jul. 16, 2013] Retrieved from the internet <URL:http://web.archive.org/web/20091209065831/http://www.mspoke.com/blog/>.
Newscred Ltd. "NewsCred Platform-Intelligent Content Delivery Solutions" Webpage for NewsCred, 2009, 1 page, [online] [Archived on webarchive.org on Mar. 10, 2009] [retrieved on Jul. 16, 2013] Retrieved from the internet <URL:http://web.archive.org/web/20090310122902/http://platform.newscred.com/>.
Oneriot, "OneRiot.com—Realtime Search for the Realtime Web," 2 pages, [online] [Archived on webarchive.org on Dec. 13, 2009] [retrieved on Jul. 22, 2013] Retrieved from the internet <URL:http://web.archive.org/web/20091213085914/http://www.oneriot.com/>.
Onespot, "Demo—Videos & Live Widgets Demonstrate Story Linking & Scoring System," 2 pages, [online] [Archived on webarchive.org on Oct. 1, 2009] [Retrieved on Jul. 16, 2013] Retrieved from the internet <URL:http://web.archive.org/web/20091001215405/http://www.onespot.com/demo/>.
Opencalais, Webpage for OpenCalais.com, Thomson Reuters, 2008, 2009, 2 pages, [online] [Archived on webarchive.org on Dec. 14, 2009] [retrieved on Jul. 16, 2013] Retrieved from the internet <URL:http://web.archive.org/web/20091214080847/http://www.opencalais.com/>.
Peerset Inc., "Peerset Social Psychographic Targeting," 2008, 1 page, [online] [Archived on webarchive.org on Feb. 7, 2009] [retrieved on Jul. 22, 2013] Retrieved from the internet <URL:Targetinghttp://web.archive.org/web/20090207070503/http://www.peerset.com/>.
Quantcast Corporation, "Quantcast—Marketer Overview," 2010, 2 pages, [online] [Archived on webarchive.org on Oct. 2, 2010] [Retrieved on Jul. 22, 2013] Retrieved from the internet <URL:http://web.archive.org/web/20101002113816/http://www.quantcast.com/info/marketer-overview?>.
Quantcast Corporation, "Quantcast Audience—Quantcast Lookalikes," 2011, 1 page, [online] [Archived on webarchive.org on Oct. 5, 2011] [Retrieved on Jul. 22, 2013] Retrieved from the internet <URL:http://web.archive.org/web/20111005232003/http://www.quantcast.com/info/lookalikes>.
Rao, R., "The long tail gets interesting," Fortune Tech, Dec. 15, 2009, 5 pages, [online] [Retrieved on Jun. 24, 2011] Retrieved from the internet <URL: http://tech.fortune.cnn.com/2009/12/15/the-long-tail-gets-interesting/>.
Resonate Networks, Inc., "Resonate Networks—About Us," 2010, 1 page, [online] [Archived on webarchive.org on Aug. 23, 2010] [retrieved on Jul. 22, 2013] Retrieved from the internet <URL:http://web.archive.org/web/20100823091037/http://www.resonatenetworks.com/about-us/>.
Scoopler, Inc., "Scooper: Real-time search," 2009, 1 page, [online][Archived on webarchive.org on Jun. 28, 2009] Retrieved from the internet <URL:http://web.archive.org/web/20090628091418/http://www.scoopler.com//>.
sency.com, "Sency—What's Going on?" 2009, 1 page, [online] [Archived on webarchive.org on Dec. 2, 2009] [retrieved on Jul. 22, 2013] Retrieved from the internet <URL:http://web.archive.org/web/20091202104834/http://sency.com/?>.
Solariat, "The Science Behind Solariat," 2010, 1 page, [online] [Archived on webarchive.org on Aug. 16, 2010] [retrieved on Jul. 22, 2013] Retrieved from the internet <URL:http://web.archive.org/web/20100816113817/http://www.solariat.com/science.php>.
Stumbleupon, "StumbleUpon's Recommendation Technology," 3 pages, [online] [Archived on webarchive.org on Feb. 23, 2009] [Retrieved on Jul. 16, 2013] Retrieved from the internet <URL:http://web.archive.org/web/20090223130608/http://www.stumbleupon.com/technology/>.
topicfire.com. "Topicfire—News," 4 pages, [online] [Archived on webarchive.org on Dec. 14, 2009] [retrieved on Jul. 16, 2013] Retrieved from the internet <URL:http://web.archive.org/web/20091214173100/http://topicfire.com/>.
Topsy Labs, Inc., "Topsy—A search engine powered by tweets," 2009, 2 pages, [online][Archived on webarchive.org on Sep. 22, 2009] Retrieved from the internet <URL:http://web.archive.org/web/20090922224949/http://topsy.com/?>.

(56) References Cited

OTHER PUBLICATIONS

Van Grove, J., "Google Revamps Google News," Mashable.com, Jun. 30, 2010, 6 pages, [online] [retrieved on Jul. 16, 2013] Retrieved from the internet <URL:http://mashable.com/2010/06/30/google-news/>.

Wikipedia, "Collaborative filtering," Last Modified Jun. 12, 2009, 6 pages [online] [Archived on webarchive.org on Jun. 24, 2009] [Retrieved on Jul. 16, 2013] Retrieved from the internet <URL:http://web.archive.org/web/20090624064202/http://en.wikipedia.org/wiki/Collaborative_Filtering>.

Wowd Inc., "Wowd: Discover what's popular on the web," 1 page, [online] [Archived on webarchive.org on Oct. 25, 2009] [retrieved on Jul. 22, 2013] Retrieved from the internet <URL:http://web.archive.org/web/20091025190625/http://www.wowd.com/>.

Zemanta Ltd., "Zemanta—The best semantic API for Tags, Link and Pictures," 2009, 2 pages, [online] [Archived on webarchive.org on May 1, 2009] [retrieved on Jul. 16, 2013] Retrieved from the internet <URL:http://web.archive.org/web/20090501022352/http://www.zemanta.com/api/>.

Arrington, M., "Exclusive: Ex- MySpace Execs Launce Gravity Into Private Beta," TechCrunch, Dec. 16, 2009, 10 pages, [online] [retrieved on Jun. 24, 2011] Retrieved from the internet <URL:http://techcrunch.com/2009/12/16/exclusive-ex-myspace-execs-launch-gravity-into-private-beta/>.

Arrington, M., "Time to Meet Wavii, The Super Stealth, Super Awesome Startup Based in . . . Seattle?" TechCrunch, Jul. 21, 2010, 7 pages, [online] [retrieved on Jun. 24, 2011] Retrieved from the internet <URL:http://techcrunch.com/2010/07/21/time-to-meet-wavii-the-super-stealth-super-awesome-startup-based-in-seattle/>.

Kirkpatrick, M., "MySpace Preparing to go Beyond Friends in your News Feed ," Read Write Web, Aug. 3, 2010, 2 pages, [online] [retrieved on Jun. 24, 2011] Retrieved from the internet <URL:http://www.readwriteweb.com/archives/myspace_preparing_to_put_celebrity_news_in_your_ne.php>.

Kirkpatrick, M., "Hunch Relaunches as Internet Personalization Service," Read Write Web, Aug. 4, 2010, 2 pages, [online] [retrieved on Jun. 24, 2011] Retrieved from the internet <URL:http://www.readwriteweb.com/archives/hunch_internet_personalization_service.php>.

Rao, R., "The long tail gets interesting," Fortune Tech, Dec. 15, 2009, 3 pages, [online] [retrieved on Jun. 24, 2011] Retrieved from the internet <URL: http://tech.fortune.cnn.com/2009/12/15/the-long-tail-gets-interesting/>.

Van Grove, J., "Google Revamps Google News," Mashable.com, Jun. 30, 2010, 5 pages, [online] [retrieved on Jun. 24, 2011] Retrieved from the internet <URL:http://mashable.com/2010/06/30/google-news/>.

Audiencescience, "Retargeting, Geographic Targeting, Geotargeting, Targeted Web Advertising," 2010, 3 pages, [online] [Archived on webarchive.org on Jul. 26, 2010] [Retrieved on Oct. 5, 2011] Retrieved from the internet <URL:http://web.archive.org/web/20100726044954/http://www.audiencescience.com/technology/advertisers >.

"Welcome to Audience Targeting!" AudienceScience.com, 3 pages, [online] [Archived on webarchive.org on Feb. 7, 2010] [retrieved on Nov. 9, 2011] Retrieved from the internet <URL:http://web.archive.org/web/20100207212603/http://audiencetargeting.com/>.

"Welcome to Audience Targeting!" AudienceScience.com, 1 page, [online] [Archived on webarchive.org on Jun. 18, 2009] [retrieved on Oct. 5, 2011] Retrieved from the internet <URL:http://web.archive.org/web/20090618131511/http://www.audiencetargeting.com/>.

BlueKai Data Exchange, 2010 2 pages [online] [Archived on webarchive.org on Aug. 19, 2010] [retrieved on Dec. 1, 2011] Retrieved from the internet <URL: http://http://web.archive.org/web/20100819140734/http://www.bluekai.com/solutions.html>.

Buzzfeed, Inc., "About BuzzFeed," 2009, 2 pages, [online] [Archived on webarchive.org on Feb. 26, 2009] [Retrieved on Oct. 5, 2011] Retrieved from the internet <URL:http://web.archive.org/web/20090226050950/http://www.buzzfeed.com/about>.

Buzzfeed, Inc., "About BuzzFeed," 2009, 3 pages, [online] [Archived on webarchive.org on Dec. 16, 2009] [Retrieved on Oct. 5, 2011] Retrieved from the internet <URL:http://web.archive.org/web/20091216093131/http://www.buzzfeed.com/about>.

Webpage for Chai Labs, 2010, 2 pages, [online] [Archived on webarchive.org on Jul. 6, 2010] [retrieved on Dec. 1, 2011] Retrieved from the internet <URL:http://web.archive.org/web/20100706072803/http://www.chailabs.com/platform/>.

Webpage for Collecta.com, 1 page [online] [Archived on webarchive.org on Dec. 1, 2009] [retrieved on Oct. 5, 2011] Retrieved from the internet <URL:http://web.archive.org/web/20091201040100/http://collecta.com/>.

Webpage for Collecta.com, 2 pages [online] [Archived on webarchive.org on Jul. 12, 2010] [retrieved on Nov. 9, 2011] Retrieved from the internet <URL:http://web.archive.org/web/20100712215014/http://collecta.com/>.

Daylife, "Daylife Overview," 3 pages, [online] [Archived on webarchive.org on Jul. 18, 2010] [Retrieved on Oct. 5, 2011] Retrieved from the internet <URL:http://web.archive.org/web/20100718062850/http://corp.daylife.com/overview/>.

Digg, Inc. "The Latest News Headlines, Videos and Images," Webpage for Digg.com, 2009, 2 pages, [online] [Archived on webarchive.org on Dec. 14, 2009] [Retrieved on Oct. 5, 2011] Retrieved from the internet <URL:http://web.archive.org/web/20091214120546/http://digg.com/>.

Digg, Inc. "The Latest News Headlines, Videos and Images," Webpage for Digg.com, 2010, 2 pages, [online] [Archived on webarchive.org on Aug. 4, 2010] [Retrieved on Dec. 1, 2011] Retrieved from the internet <URL:http://web.archive.org/web/20100804032222/http://digg.com/>.

Ellerdale, Inc., "The Ellerdale Project—Products" Webpage for Ellerdale.com, 3 Pages, [online] [Archived on webarchive.org on Jul. 25, 2010] [retrieved on Oct. 5, 2011] Retrieved from the internet <URL:http://web.archive.org/web/20100725150333/http://www.ellerdale.com/products.html>.

Exelate Media, "eXchange Behavioral Targeting Segments: 170M+ UV Strong," 2009, 1 Page, [online] [Archived on webarchive.org on Dec. 14, 2009] [retrieved on Dec. 1, 2011] Retrieved from the internet <URL:http://web.archive.org/web/20091214103616/http://www.exelate.com/new/buyers-targetingsegments.html>.

Exelate Media, "eXchange Behavioral Targeting Segments: 170M+ UV Strong," 2010, 1 Page, [online] [Archived on webarchive.org on Aug. 20, 2010] [retrieved on Dec. 1, 2011] Retrieved from the internet <URL: http://web.archive.org/web/20100820063641/http://www.exelate.com/new/buyers-targetingsegments.html>.

Flipboard Inc., "Flipboard for iPad," Webpage for Flipboard.com, 2010, 5 pages, [online] [Archived on webarchive.org on Aug. 1, 2010] [Retrieved on Oct. 5, 2011] Retrieved from the internet <URL:http://web.archive.org/web/20100801114228/http://www.flipboard.com/>.

Hawthorne Labs, "Apollo—The newspaper of the future," 2010, 2 pages [online] [Archived on webarchive.org on Aug. 8, 2010] [Retrieved on Oct. 5, 2011] Retrieved from the internet <URL:http://http://web.archive.org/web/20100808230643/http://hawthornelabs.com/>.

Hunch Inc., "How Hunch Works," 2009, 2 pages, [online] [Archived on webarchive.org on Nov. 26, 2009] [Retrieved on Oct. 5, 2011] Retrieved from the internet <URL:http://web.archive.org/web/20091126173555/http://www.hunch.com/info/how-hunch-works/>.

Hunch Inc., "How Hunch Works," 2010, 2 pages, [online] [Archived on webarchive.org on Jul. 2, 2010] [Retrieved on Oct. 5, 2011] Retrieved from the internet <URL:http://web.archive.org/web/20100702161009/http://hunch.com/info/how-hunch-works/>.

Webpage for Loud3R, 2010, 2 pages, [online] [Archived on webarchive.org on Aug. 17, 2010] [retrieved on Dec. 1, 2011] Retrieved from the internet <URL:http://web.archive.org/web/20100817062817/http://www.loud3r.com/solutions/>.

Mindset Media, LLC, Webpage for www.Mindset-Media.com, 1 page, [online] [Archived on webarchive.org on Mar. 18, 2009] [Retrieved on Oct. 5, 2011] Retrieved from the internet <URL:http://web.archive.org/web/20090318212800/http://www.mindset-media.com/>.

(56) References Cited

OTHER PUBLICATIONS

Mindset Media, LLC, Webpage for www.Mindset-Media.com, 1 page, [online] [Archived on webarchive.org on May 17, 2010] [Retrieved on Oct. 5, 2011] Retrieved from the internet <URL:http://web.archive.org/web/20100517131026/http://www.mindset-media.com/.

Webpage for mSpoke.com, 2008, 2 pages [online] [Archived on webarchive.org on Dec. 8, 2009] [retrieved on Dec. 1, 2011] Retrieved from the internet <URL:http://web.archive.org/web/20091208055908/http://www.mspoke.com/engine.html>.

Webpage for mSpoke.com, 2008, 2 page [online] [Archived on webarchive.org on Aug. 17, 2010] [retrieved on Dec. 1, 2011] Retrieved from the internet <URL:http://web.archive.org/web/20100817171125/http://www.mspoke.com/engine.html>.

mSpoke Corporate Blog, 12 Pages, [online] [Archived on webarchive.org on Dec. 9, 2009] [retrieved on Dec. 1, 2011] Retrieved from the internet <URL:http://web.archive.org/web/20091209065447/http://www.mspoke.com/blog/?>.

mSpoke Corporate Blog, 12 Pages, [online] [Archived on webarchive.org on Aug. 26, 2010] [retrieved on Dec. 1, 2011] Retrieved from the internet <URL:http://web.archive.org/web/20100826024601/http://www.mspoke.com/blog/?>.

Newscred Ltd. "NewsCred Platform-Intelligent Content Delivery System" Webpage for NewsCred, 2009, 2 pages, [online] [Archived on webarchive.org on May 4, 2010] [retrieved on Nov. 9, 2011] Retrieved from the internet <URL:http://web.archive.org/web/20100504125919/http://platform.newscred.com/>.

Newscred Ltd. "NewsCred Platform-Intelligent Content Delivery System" Webpage for NewsCred, 2009, 2 pages, [online] [Archived on webarchive.org on Mar. 10, 2009] [retrieved on Nov. 9, 2011] Retrieved from the internet <URL:http://web.archive.org/web/20090310122902/http://platform.newscred.com/.

"OneRiot.com—Realtime Search for the Realtime Web," Webpage for OneRiot.com, 5 pages, [online] [Archived on webarchive.org on Oct. 27, 2009] [retrieved on Oct. 5, 2011] Retrieved from the internet <URL:http://web.archive.org/web/20091027005827/http://www.oneriot.com/>.

Onespot, "Demo—Videos & Live Widgets Demonstrate Story Linking & Scoring System," 4 pages, [online] [Archived on webarchive.org on Jun. 2, 2009] [Retrieved on Oct. 5, 2011] Retrieved from the internet <URL:http://web.archive.org/web/20090602133717/http://www.onespot.com/demo/>.

Onespot, "Demo—Videos & Live Widgets Demonstrate Story Linking & Scoring System," 6 pages, [online] [Archived on webarchive.org on Jul. 10, 2010] [Retrieved on Oct. 5, 2011] Retrieved from the internet <URL:http://web.archive.org/web/20100710185330/http://www.onespot.com/demo/>.

Webpage for OpenCalais.com, Thomson Reuters, 2008, 2009, 3 pages, [online] [Archived on webarchive.org on Dec. 8, 2009] [retrieved on Oct. 5, 2011] Retrieved from the internet <URL:http://web.archive.org/web/20091208175653/http://www.opencalais.com/>.

Webpage for OpenCalais.com, Thomson Reuters, 2008, 2009, 2010, 2 pages, [online] [Archived on webarchive.org on Aug. 2, 2010] [retrieved on Oct. 5, 2011] Retrieved from the internet <URL:http://web.archive.org/web/20100802013437/http://www.opencalais.com/>.

Peerset Inc., "Peerset | the science of infinite connections," Webpage for Peerset.com, Peerset Inc. 2010, 1 page, [online] [Archived on webarchive.org on May 25, 2010] [retrieved on Oct. 5, 2011] Retrieved from the internet <URL:http://web.archive.org/web/20100525020133/http://www.peerset.com/>.

Peerset Inc., "Peerset | Social Psychographic," Webpage for Peerset.com, Peerset Inc. 2008, 1 page, [online] [Archived on webarchive.org on Feb. 7, 2009] [retrieved on Oct. 5, 2011] Retrieved from the internet <URL:Targetinghttp://web.archive.org/web/20090207070503/http://www.peerset.com/>.

Quantcast Corporation, "Quantcast—Marketer Overview," 2010, 1 page, [online] [Archived on webarchive.org on Oct. 2, 2010] [Retrieved on Oct. 5, 2011] Retrieved from the internet <URL:http://web.archive.org/web/20101002113816/http://www.quantcast.com/info/marketer-overview?>.

"Quantcast Audience—Quantcast Lookalikes," Quantcast, 2011, 1 page, [online] [retrieved on Jun. 24, 2011] Retrieved from the internet <URL:http://www.quantcast.com/info/lookalikes>.

"Resonate Networks—About Us," Webpage for Resonate Networks, Resonate Inc., 2010, 2 pages, [online] [Archived on webarchive.org on Aug. 23, 2010] [retrieved on Oct. 5, 2011] Retrieved from the internet <URL:http://web.archive.org/web/20100823091037/http://www.resonatenetworks.com/about-us/>.

Scoopler, Inc., Webpage for www.scoopler.com, 2009, 1 page, [online] [Archived on webarchive.org on Nov. 16, 2009] [Retrieved on Oct. 5, 2011] Retrieved from the internet <URL:http://web.archive.org/web/20091116075904/http://www.scoopler.com/>.

Scoopler, Inc., Webpage for www.scoopler.com, 2010, 1 page, [online] [Archived on webarchive.org on Aug. 8, 2010] [Retrieved on Oct. 5, 2011] Retrieved from the internet <URL:http://web.archive.org/web/20100801114258/http://www.scoopler.com/>.

"Sency—What's Going On?" Webpage for Sency.com, 2009, 1 page, [online] [Archived on webarchive.org on Dec. 2, 2009] [retrieved on Oct. 5, 2011] Retrieved from the internet <URL: http://web.archive.org/web/20091202104834/http://sency.com/?>.

"Sency—What's Going On?" Webpage for Sency.com, 2009-2010, 1 page, [online] [Archived on webarchive.org on Apr. 24, 2010] [retrieved on Oct. 5, 2011] Retrieved from the internet <URL: http://web.archive.org/web/20100424101538/http://sency.com/>.

Solariat, "The Science Behind Solariat," 2010, 1 page, [online] [Archived on webarchive.org on Aug. 16, 2010] [retrieved on Dec. 1, 2011] Retrieved from the internet <URL:http://web.archive.org/web/20100816113817/http://www.solariat.com/science.php>.

Stumbleupon, "StumbleUpon's Recommendation Technology," 3 page, [online] [Archived on webarchive.org on Feb. 23, 2009] [Retrieved on Oct. 5, 2011] Retrieved from the internet <URL:http://web.archive.org/web/20090223130608/http://www.stumbleupon.com/technology/>.

Stumbleupon, "StumbleUpon's Recommendation Technology," 3 pages, [online] [Archived on webarchive.org on Jul. 22, 2010] [Retrieved on Oct. 5, 2011] Retrieved from the internet <URL:http://web.archive.org/web/20100722091213/http://www.stumbleupon.com/technology/>.

"Topicfire—News," Webpage for Topicfire.com, 4 pages, [online] [Archived on webarchive.org on Dec. 14, 2009] [retrieved on Oct. 5, 2011] Retrieved from the internet <URL:http://web.archive.org/web/20091214173100/http://topicfire.com/>.

"Topicfire • Real-time ranked news," Webpage for Topicfire.com, 5 pages, [online] [Archived on webarchive.org on Aug. 9, 2010] [retrieved on Oct. 5, 2011] Retrieved from the internet <URL:http://web.archive.org/web/20100809125831/http://topicfire.com/>.

Webpage for Topsy.com, Topsy Labs, Inc., 2010, 1 page, [online] [Archived on webarchive.org on Aug. 13, 2010] [retrieved on Oct. 5, 2011] Retrieved from the internet <URL:http://web.archive.org/web/20100813025948/http://topsy.com/>.

Webpage for Topsy.com, Topsy Labs, Inc., 2009, 1 page, [online] [Archived on webarchive.org on Nov. 15, 2009] [retrieved on Oct. 5, 2011] Retrieved from the internet <URL:http://web.archive.org/web/20091115114504/http://topsy.com/>.

Wikipedia, "Collaborative filtering," Last Modified Jun. 12, 2009, 6 pages [online] [Archived on webarchive.org on Jun. 24, 2009] [Retrieved on Oct. 5, 2011] Retrieved from the internet <URL:http://web.archive.org/web/20090624064202/http://en.wikipedia.org/wiki/Collaborative_Filtering>. http://web.archive.org/web/20100210043441/http://en.wikipedia.org/wiki/Collaborative_filtering.

Wikipedia, "Collaborative filtering," Last Modified Feb. 9, 2010, 6 pages [online] [Archived on webarchive.org on Feb. 10, 2010] [Retrieved on Oct. 5, 2011] Retrieved from the internet <URL:http://web.archive.org/web/20100210043441/http://en.wikipedia.org/wiki/Collaborative_filtering>.

(56) References Cited

OTHER PUBLICATIONS

"Wowd real-time search: Discover what's popular right now," Webpage for Wowd.com, Wowd Inc., 1 page, [online] [Archived on webarchive.org on Aug. 8, 2010] [retrieved on Oct. 5, 2011] Retrieved from the internet <URL:http://web.archive.org/web/20100808023337/http://www.wowd.com/>.

Wowd: Discover what's popular on the web, Webpage for Wowd.com, Wowd Inc., 1 page, [online] [Archived on webarchive.org on Nov. 8, 2009] [retrieved on Oct. 5, 2011] Retrieved from the internet <URL:http://web.archive.org/web/20091108121553/http://www.wowd.com/>.

"Zemanta—The best semantic API for Tags, Link and Pictures," Zemanta Ltd., 2006-2009, 2 pages, [online] [Archived on webarchive.org on Jul. 24, 2010] [retrieved on Oct. 5, 2011] Retrieved from the internet <URL:http://web.archive.org/web/20100724051910/http://www.zemanta.com/api/>.

"Zemanta—The best semantic API for Tags, Link and Pictures," Zemanta Ltd., 2009, 2 pages, [online] [Archived on webarchive.org on May 1, 2009] [retrieved on Oct. 5, 2011] Retrieved from the internet <URL:http://web.archive.org/web/20090501022352/http://www.zemanta.com/api/>.

\* cited by examiner

PERSONALIZED CONTENT DELIVERY SYSTEM

CROSS REFERENCE TO RELATED APPLICATIONS

This application claims the benefit of U.S. Provisional Application No. 61/286,517, filed Dec. 15, 2009, which is incorporated by reference in its entirety.

BACKGROUND

1. Field of Art

The disclosure generally relates to the field of behavioral analysis and more specifically to delivering personalized content.

2. Description of the Related Art

Information overload is a common problem in today's online environment. Social networking websites produce millions of messages per day, news websites post thousands of articles each day, and video sharing websites add hundreds of megabytes of video each second. As the web expands and new content is made available, it becomes increasingly difficult to find good content. In particular, conventional content delivery systems are struggling to cope with the growing amount of online content. Because conventional systems have a limited amount of information about their users' interests, it is difficult for them to tailor content to the individual needs of each user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium for generating personalized content for a user. The system includes an interest graph that shows the user's current attachment to one or more topics and/or the user's attachment to topics over time. To maintain the interest graph, the system receives information about an action performed by a user. For example, the action may create or interact with content. The language of the content is analyzed to determine a topic of the content. The system then modifies the graph of the user's interests to indicate the user's changed (e.g., increased or decreased) interest in the topic. Maintaining an interest graph based on the user's own actions thus enables up-to-date tracking of a user's interests, thereby enabling generation of personalized content based on the user's interests.

To generate personalized content, the system receives content such as news articles or advertisements. One or more topics of the content are determined by analyzing the language of the content. The system determines a similarity between the user's interests and the topics of the content, and also determines the current popularity of the content. Personalized content is then generated for the user based on the determined similarity and the current popularity of the content. In this way, the system uses the user's own interests to identify content that is likely to be important to the user.

Computing Machine Architecture

Figure 1:
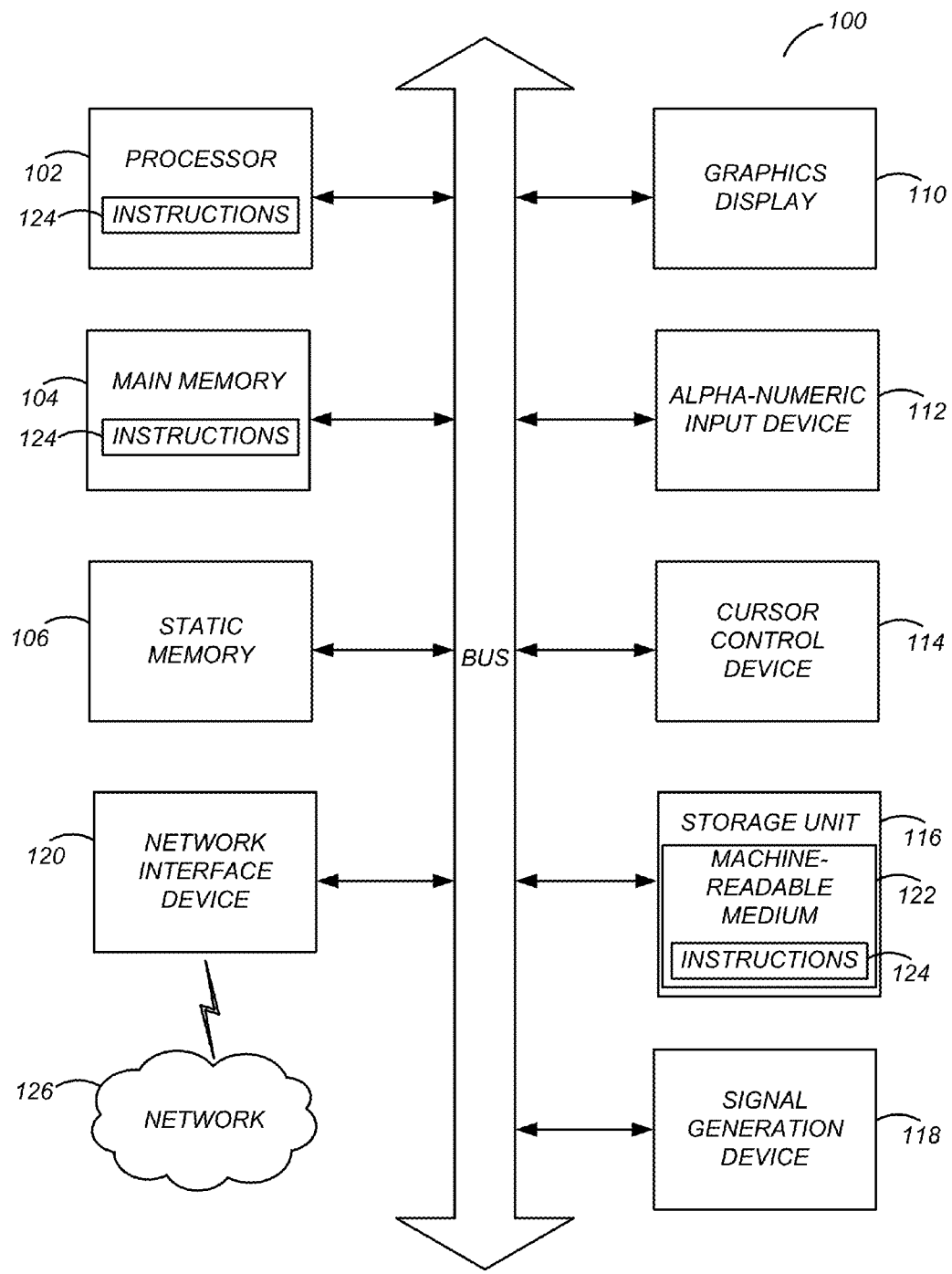
FIG. 1 illustrates one embodiment of components of an example machine able to read instructions from a machine-readable medium and execute them in a processor or controller.

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media. The processes described herein are in the context of such an example machine.

System Overview

Figure 2:
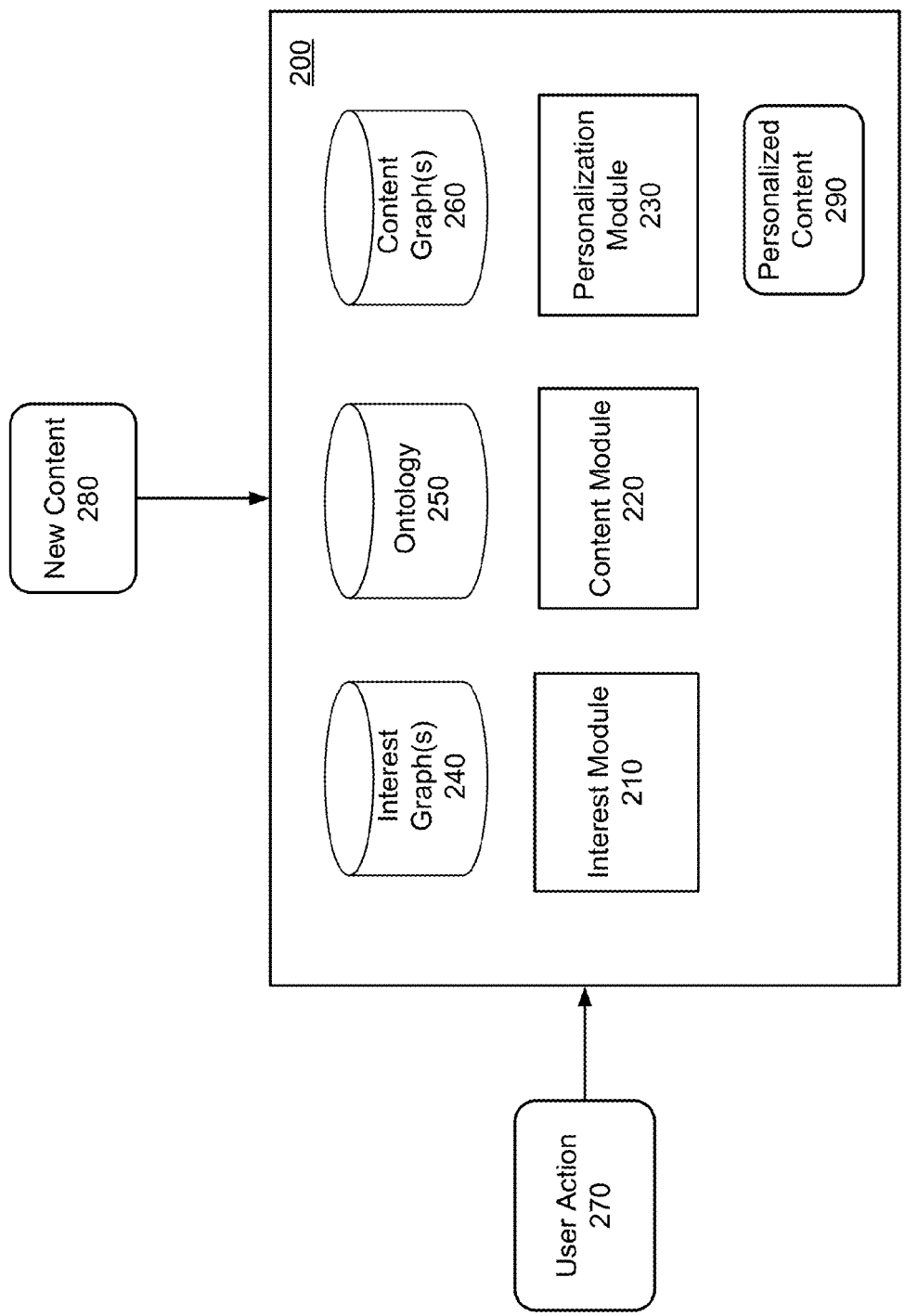
FIG. 2 illustrates a high-level block diagram of one embodiment of a content delivery system.

FIG. 2 illustrates a high-level block diagram of one embodiment of a content delivery system. For purposes of illustration, FIG. 2 divides operation of the content delivery system 200 into three functional modules, an interest module 210, a content module 220, and a personalization module 230. However, in various embodiments, the functionality described as occurring in one module may occur in other modules or be distributed across multiple modules. In an embodiment, the content delivery system 200 is implemented by a computing system 100, as described above in conjunction with FIG. 1.

As shown, the content delivery system 200 includes an ontology 250. In one embodiment, the ontology is a data graph including a plurality of nodes and edges that connect the nodes. Each node represents a particular topic, for example "surfing" or "wakeboarding". Nodes are connected by edges that represent the relationships between multiple topics. For example, the topics of surfing and wakeboarding can both be linked to the topic of extreme sports through an edge in the data graph. The edge can further indicate the type of relationship between one topic and another, such as whether one topic is a sub-topic of another topic. For example, surfing and wakeboarding can be linked to extreme sports through an edge in the interest graph indicating that surfing and wakeboarding are sub-topics of extreme sports. In other words, the ontology can be viewed as a plurality of topics that are mapped into a graph which indicates the relationships between topics.

In one embodiment, topics in the ontology 250 are associated with a pre-defined set of lexical features that represent linguistic characteristics of the topic. The lexical features can be used to analyze the language of textual content in order to identify a topic of the content. In one embodiment, the lexical features are word patterns or textual signatures that are indicative of a particular topic. For example, the topic of surfing may be associated with the word pattern of "paddled out." Thus, content that includes the word pattern "paddled out" with a fairly high frequency is likely to be content that involves the topic of surfing. As another example, the topic of politics may be associated with the proper noun "Barack Obama." Thus, content that includes the word "Barack Obama" is likely to be content that involves the topic of politics. As a further example, a lexical feature is a rule that says if a sentence starts with the phrase "ABC is from," then the sentence is likely to be about the topic ABC.

In one embodiment, the ontology 250 is accessed by the various modules for identifying the topics of content corresponding to user actions 270 ("user content") and content 280. One technique for creating an ontology is described in commonly owned U.S. patent application Ser. No. 12/968,194, titled "Conversational Lexicon Analyzer," filed on Dec. 14, 2010, the contents of which are incorporated by reference in its entirety.

The content delivery system 200 also includes multiple content graph(s) 260. A content graph is separately maintained for each piece of content 280 received by the content delivery system 200. Content 280 includes any type of electronic content that contains text or metadata that can be used to identify the topic of the content. This includes, for example, webpages, news articles, advertisements, blog posts, forum posts, product reviews, Q&A answers, videos, music, applications, or the like. Each content graph 260 includes information about the topics associated with a piece of content, as well as confidence score representing the likelihood that the topic matches the content. In one embodiment, the content graphs also store other information about the content, such as a virality score that indicates the current popularity of the content. In one embodiment, content graphs are also stored for content corresponding to user actions 270. The process of building a content graph is further described in conjunction with FIG. 4.

The content module 220 contains functionality for generating content graphs 260 from incoming content, such as new content 280 or content corresponding to a user action 270. The content module extracts content into a normalized format so that the content can be analyzed with natural language processing techniques. The content module 220 then analyzes the language of content to identify one or more topics of the new content 280 using the ontology 250. In one embodiment, each topic is assigned a confidence score to indicate the strength of the relationship between the piece of content 280 and one or more topics. In one embodiment, each piece of new content 280 is also assigned a virality score to indicate the popularity of the new content 280. Using factors such as the topics, confidence scores, and virality score, the content module 220 outputs a content graph 260 for each piece of new content. The result is a rich knowledgebase of content graphs 260 that represent the topics, popularity, and relative importance of various pieces of content 280.

The content delivery system 200 also includes multiple interest graphs 240. An interest graph is separately maintained for each user tracked by the content delivery system 200. Each interest graph represents the user's interest in a plurality of different topics. In one embodiment, the interest graph for a user comprises a plurality of topics and the user's attachment level (e.g., a level between 1-100) to each of the topics, which provides an indication of topics that the user is interested in. In another embodiment, the interest graph further comprises a user's attachment level to the topics over a period of time, which provides an indication of rising and decreasing levels of interest. Initially, each interest graph 240 may be created from a user explicitly providing the user's interests to the content delivery system 200, or created from the user's profile information as stored in a social networking website (e.g., TWITTER, FACEBOOK). The interest graphs 240 can be updated by the interest module 210 based on received user actions 270. Additionally, the interest graph 240 can also be accessed by the various modules.

The interest module 210 contains functionality for generating or updating an interest graph 240 from user actions 270. The interest module 210 receives information about the user action 270. Some user actions 270 generate content. Examples include posting a status update on a social networking website, posting comments for other users of a social networking website, updating a current geographical location, posting entries to a blog, posting messages to an online message forum, posting messages to an online message group (e.g. GOOGLE groups), etc. Other user actions interact with content, such as browsing the web and clicking on Uniform Resource Locators (URLs) for various webpages, declaring a preference for a webpage (e.g., via the FACEBOOK like button), etc. Other actions 270 both generate content and interact with content. For example posting a comment to an online news article generates new content (e.g., the comment) and interacts with content (e.g., the news article). Further, the action 270 may comprise an interaction with the content delivery system 200 or an interaction with a system that is external to the content delivery system 200, such as an interaction with an external website.

Content corresponding to a user action 270 is referred to herein as user content. User content is used specifically to update a user's interest graph. This is in contrast to new content 280, which is generally used to generate personalized content 290 that is output to a user. However, in some situations there may be overlap between user content and new content 280. For example, new content 280 may include the page located at www.fakewebsite.orf. The page at this address is also treated as user content if the user broadcasts a social networking message that includes a link to the page www.fakewebsite.orf.

The interest module 210 updates the interest graphs 240 based on the topics of the user action 270 such that the interest graphs 240 accurately reflects the user's current interests. For received actions 270, the interest module 270 may invoke the functionality of the content module 220 to identify the topics of the user content. Alternatively, if a content graph 260 already exists for the user content, the interest module 210 retrieves the topics of the user content from the content graph 260 for the user content. The interest module 210 then applies the topics of the user content to the user's interest graph 240 to update the user's interest graph 240. In this way, the interest graph 240 for the user accurately reflects the user's current interest level in various topics based on the user's actions 270. The process of building an interest graph is described in conjunction with FIG. 3.

To deliver personalized content 280 for a user of the content delivery system 200, the personalization module 230 compares the user's interest graph 240 to a plurality of the content graphs 260 to determine the similarity between the user's current interests and the topics of the new content 280. In another embodiment, the personalization module 230 first estimates the user's future interests and then determines the similarity between the user's future interests and the topics of the content 280. An overall score is computed for each piece of content 280. The overall score is based on the similarity between the user's interests and the content 280 as well as the popularity of the content 280. Pieces of content 280 with the highest overall scores are used to generate personalized content 290 for the user. The personalization module 230 then outputs the personalized content 290, such as for display to a user in a remote location. Generating personalized content is further described in conjunction with FIG. 5.

Maintaining an interest graph for each user enables the content delivery system 200 to deliver personalized content to users tracked by the content delivery system 200. Each user's unique interest graph 240 is used to identify and prioritize content 280 that the user will be interested in. As a result, each user can be presented with a different, personalized set of content 290 that is likely to be important to the user.

Generating an Interest Graph

Figure 3:
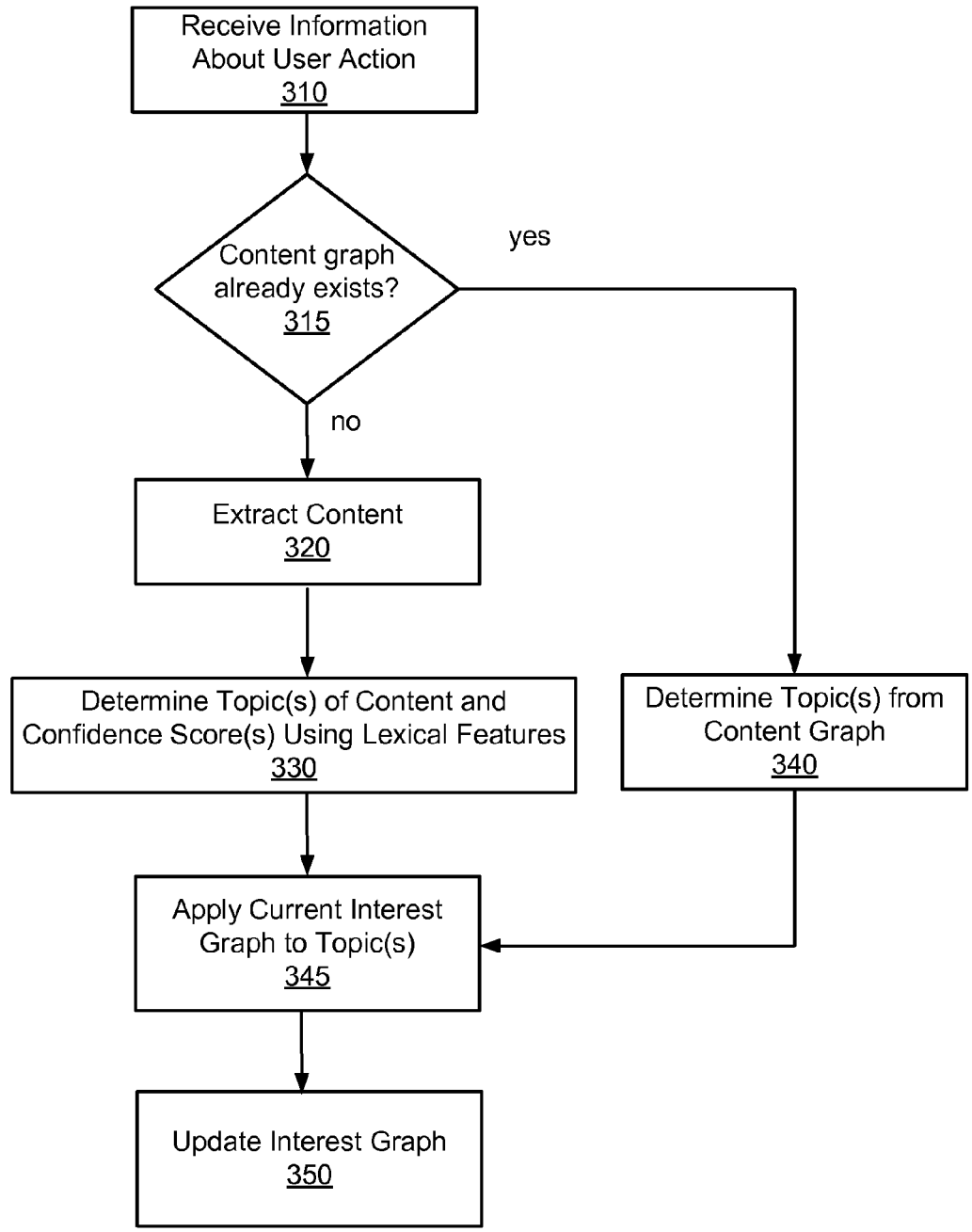
FIG. 3 illustrates one embodiment of a method for generating an interest graph according to an embodiment.

FIG. 3 illustrates one embodiment of a method for generating an interest graph according to an embodiment. In an embodiment, the steps depicted in the method shown in FIG. 3 are implemented by instructions for performing the described actions embodied or stored within the machine-readable medium 122, such as the main memory 104 or the storage unit 116 memory, which are executable by the processor 102. Those of skill in the art will recognize that the method may be implemented in embodiments of hardware and/or software or combinations thereof. Those of skill in the art will recognize that other embodiments can perform the steps of FIG. 3 in different orders or include different and/or additional steps than the ones described herein.

Initially, a user performs an action in an online environment. As previously described in conjunction with FIG. 2, some actions generate new content, some actions interact with existing content, and some actions both generate new content and interact with existing content.

The system then receives 310 information about the user action. In one embodiment, the system is capable of receiving 310 different types of actions in various different forms. For example, if the action is browsing the web, the user's actions may be tracked by the website that the user is interacting with, by software embedded in the website that the user is interacting with, by the user's web browser, or by a software tool installed on the user's computer. This action is received 310 in the form of a clickstream, which can comprise a list of websites that a user has accessed and the amount of time spent at each website. If the action is broadcasting a current geographical location, the action is received 310 in the form of positional coordinates such as a latitude and longitude. If the action is posting a message to a forum, the action may be in the form of the HTML code of the forum page. If the action is posting a message via a social networking website (e.g., tweet on TWITTER, status update on FACEBOOK), the action may be received in a specific format specified by the social networking website. Other examples are also possible but will not be listed herein.

In one embodiment, the system may actively seek out and retrieve information about new user actions. For example, information about the user's actions may be stored by a system that is external to the personalization content system 200, such as a social networking system (e.g., FACEBOOK or TWITTER). The external system provides an Application Programming Interface (API) that enables the content delivery system to request and receive information about the user actions. Alternatively or additionally, the system is passive. For example, the system may rely on users to provide their actions, or it may receive automatic updates of user actions from an external website that the user interacts with (e.g., clickstream data).

The system then determines 315 if a content graph already exists for the content corresponding to the user action ("user content"). If a content graph already exists for the user content, the topics and confidence values for the user content can simply be determined 340 from the existing content graph. For example, if the user action involves browsing to a particular website, the website may already be associated with a content graph 260 in the content delivery system 200. The system can then easily retrieve the topics of the user content from this stored content graph 260.

If a content graph 260 does not yet exist, the user content is analyzed to identify the topics of the user content. In one embodiment, the system extracts 320 user content into a normalized format, such as a textual sentences, a series of text strings, or metadata fields. Extracting 320 content into a normalized format enables analysis of the content with natural language processing techniques for determining one or more topics associated with the action. The process of extraction 320 varies depending on the type and source of the received action. The following are a few examples of how content can be extracted 320 for different actions. If the action is posting a message to an online message forum, the content is the text of the posted message, which can be extracted by examining the HTML tags of the code in the forum webpage. If the action is updating a status in a social networking website, the content is the text of the status update, which can be extracted from data received from the social networking website. If the action is updating a geographical location of the user, the content can be a set of location coordinates. To extract 320 the coordinates into a normalized format, the system converts the latitude and longitude into a textual description of the location (e.g., city and state). If the action is browsing the web, the system may receive a clickstream that comprises a series of URLs accessed by a user. To extract 320 the clickstreams into a normalized format, the system retrieves the webpages located at the URLs in the clickstreams and extracts relevant textual information from the webpages. For example, if the webpage is written in HTML and includes an embedded news article, the system extracts the text of the article while discarding the HTML tags.

The system then determines 330 one or more topics of the content by analyzing the language of content. In one embodiment, determining 330 one or more topics comprises determining confidence scores for one or more topics. A confidence score represents the likelihood that the content matches a particular topic. In one embodiment, lexical features of the content are identified and compared to stored lexical features in the ontology 250 to determine 330 topics and confidence scores. For example if the phrase "paddled out" appears with a high frequency in the content, and the phrase "paddled out" is associated with the topic of surfing in the ontology, it is likely that the content is about surfing. In another embodiment, one or more methods of keyword extraction are applied to the content to determine 330 the topics and confidence scores. For example, if a video file contains the tag for "dieting" then the video is likely to be about the topic of dieting. In other embodiments, a combination of lexical feature analysis and keyword extraction other similar methods are used to determine 330 topics and confidence scores.

In another embodiment, the system applies 345 the user's own interest graph to the determined topics to help better interpret the meaning of the user content. In other words, the user's interest graph is part of a feedback loop in which the user's current interests provide additional context in interpreting the meaning of the user's actions. For example, an action may be an entry in the user's blog stating "I like Boston". Boston can refer to a number of different topics, such as the city of Boston or the band named Boston. Without additional context, it can be difficult to identify the best topic match for this sentence. To help identify the right topic, the system obtains topics from the user's interest graph, uses the ontology to identify relationships between topics in the user's interest graph and the potential topics of the user action, and modifies the confidence level for the potential topics based on the strength of the identified relationship. Referring again to the prior example, if the user's interest graph indicates that the user has a strong attachment to guitars and rock music from the 1980's, it increases the likelihood that the sentence refers to the band named Boston. This is because guitars, rock music from the 1980's, and the band Boston are likely related to each other either directly, or indirectly in the ontology. However, if the user's interest graph indicates that the user has a strong attachment to the Boston Red Sox and Boston College, it increases the likelihood that the sentence refers to the city of Boston.

At this point, a user action is associated with one or more topics and/or confidence scores. Next, the system updates 350 the user's interest graph to reflect the user's interests based on the topics associated with the user action. If the user action is associated with a topic, the user's attachment to that topic in the interest graph is modified (i.e., increased or decreased). Some actions are positive actions that cause an increase in a user's attachment to a topic. For example, posting a comment on a surfing forum will cause an increase in an attachment to surfing. Other actions are negative actions that cause a decrease in a user's attachment to a topic. For example, if a clickstream indicates that a user only spent 2 seconds on a surfing webpage before spending 10 minutes on a fishing webpage, the user's attachment to surfing is decreased and the attachment to fishing is increased.

In one embodiment, the amount of the modification to an attachment level is based on the confidence score associated with the topic. For example, if the confidence score for a topic associated with the action is high, the user's attachment to that topic is modified by a large amount. If the confidence score for a topic associated with the action is low, the user's attachment to that topic is modified by a lesser amount. In one embodiment, the amount of modification in a user's attachment to a topic is based on the type of the action. Some actions cause a large change in the attachment level, whereas other actions cause a smaller change in the attachment level. An action type may refer to a category of action, such as whether an action generates new content. For example, an action generating new content may result in a larger increase in attachment than actions that interact with content but do not generate content. An action type may also refer to specific actions. For example, the action of posting a message to an online message forum may results in a large increase in attachment, while a updating a status on a social networking website may result in a smaller increase. Modifying a user's attachment based on the type of the action allows for more accurate determination of a user's interests because certain action types are better indicators of a user's true interests than other action types.

In a further embodiment, the system may also decrease a user's attachment level to topics due to the passage of time. This allows topics in a user's interest graph to decay over time, indicating that the user is becoming less interested in these topics.

The system thus maintains an interest graph for each user tracked by the content delivery system 200. The interest graph is updated based on the user's own actions to ensure that the interest graph is an accurate and up-to-date representation of the user's own interests. Maintaining the interest graph enables the content delivery system 200 to deliver personalized content to the user, as discussed below in conjunction with FIGS. 4 and 5.

Generating a Content Graph

Figure 4:
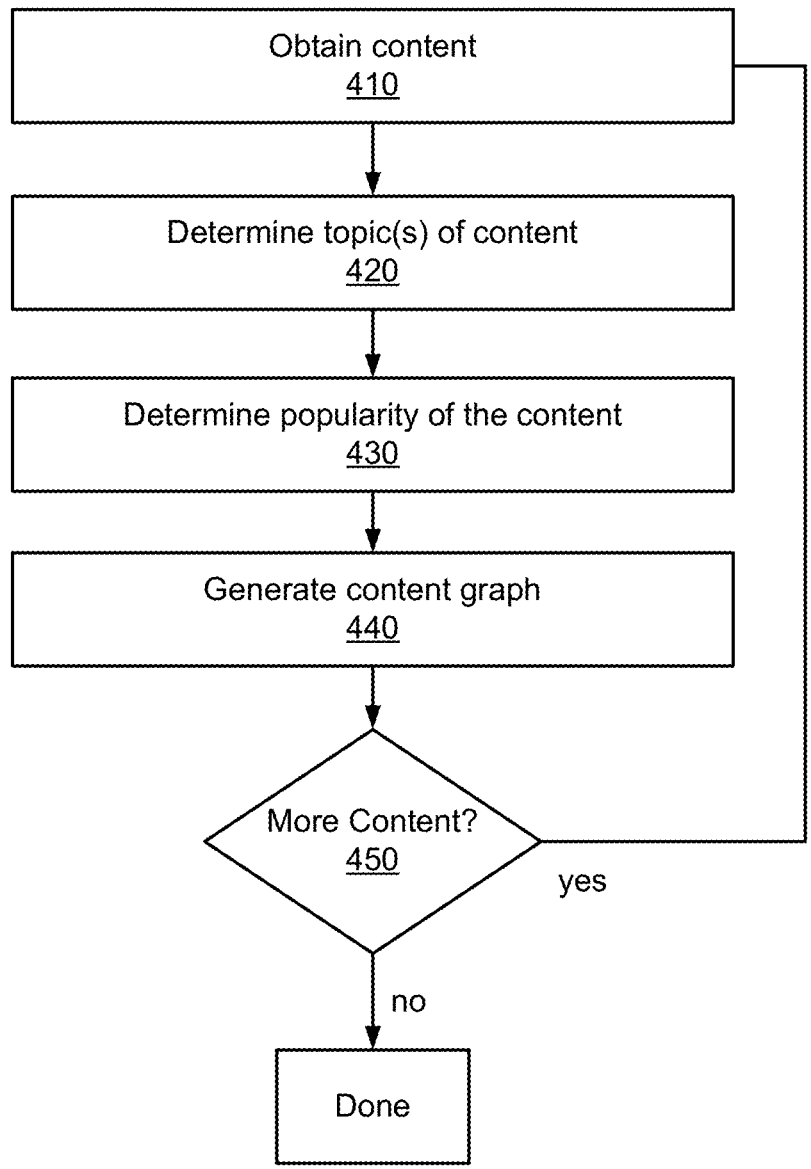
FIG. 4 illustrates a method for generating a content graph from content according to an embodiment.

FIG. 4 illustrates a method for generating a content graph 260 from content 280, according to an embodiment. In an embodiment, the steps depicted in the method shown in FIG. 4 are implemented by instructions for performing the described actions embodied or stored within the machine-readable medium 122, such as the main memory 104 or the storage unit 116 memory, which are executable by the processor 102. Those of skill in the art will recognize that the method may be implemented in embodiments of hardware and/or software or combinations thereof. Those of skill in the art will recognize that other embodiments can perform the steps of FIG. 4 in different orders or include different and/or additional steps than the ones described herein.

Initially, the system obtains 410 new content 280. Content includes any type of electronic content and can be obtained in any of a number of ways. In one embodiment, the system includes a web crawler that actively seeks out and obtains content from websites on the Internet. In another embodiment, the system obtains content through an API of the content delivery system 200 that allows third party websites to provide content to the system. For example, a news website may provide its news articles to the system so that the news articles can be used to generate a personalized newsfeed. In a further embodiment, the content module 220 obtains URL links to content that are posted by users of a social networking system (e.g., TWITTER or FACEBOOK). The system then accesses the URL link and obtains the content located at the URL link. In yet another embodiment, the system obtains a Really Simple Syndication (RSS) feed that includes content published by third party websites.

In one embodiment, obtaining content comprises normalizing the content to extract relevant information from the content. Normalizing content helps to remove extraneous information that is not useful in identifying the real topic of the content. For example, the system may receive a HTML webpage that contains a news article in the middle of the page, advertisements on the right hand side of the page, and disclaimer links on the bottom of the page. The only relevant information in this webpage is the text of the news article itself. To normalize this content, the system extracts the text of the news article while discarding non-relevant data such as HTML tags, the advertisements, and disclaimer links. Extracting content in this manner thus enables the system to properly analyze the content using language processing techniques.

The system determines 420 one or more topics associated with the content by analyzing the language of the content. In one embodiment, determining 330 one or more topics comprises computing confidence scores for one or more topics. A confidence score represents the likelihood that the content matches a particular topic. In one embodiment, lexical features of the content are identified and compared to stored lexical features in the ontology 250 to determine 420 topics and confidence scores. In another embodiment, one or more methods of keyword extraction are applied to the content to determine 420 the topics and confidence scores. In other embodiments, a combination of lexical feature analysis and keyword extractor other similar methods are used to determine 420 confidence scores for various topics.

The system determines 430 the popularity of the content. In one embodiment, determining the popularity comprises computing a virality score for the content. For example, the virality score can be computed from social network metrics, such as number of times the content has been shared with others (e.g., tweets and re-tweets on TWITTER or shared on FACEBOOK), number of times that persons have explicitly expressed an interest in the content (e.g, liking the content in FACEBOOK), number of times that persons have browsed to the content, etc. These metrics can be retrieved from social networking systems using Application Programming Interfaces (API) provided by the social networking systems. As another example, the virality score can be computed from information provided by a website that hosts the content, such as a counter on a website indicating the number of times the website has been accessed. One or more of these metrics may be combined together in computing the virality score.

In one embodiment, the virality score decays over time. The virality score thus becomes a measure of the current popularity of the content as opposed to the overall popularity of the content. In one embodiment, the virality score can be decayed, for example, by periodically computing the virality score and assigning a higher weight to more recent activity associated with the content while assigning a lower weight to activity that occurred in the past. In another embodiment, the virality score can be calculated based on the activity associated with the content within a specific time period (e.g., the last hour, day, week).

At this point in the process, the content is associated with a set of topics, confidence scores for the topics, and a virality score. This information is stored in association with the content to generate 440 a content graph. If more 450 content is available, steps 410-440 are repeated to generate a plurality of content graphs. This results in a rich set of content graphs that represent the popularity and topics of various pieces of content. The content graphs may also be updated periodically as the popularity of the content changes.

Generating Personalized Content

Figure 5:
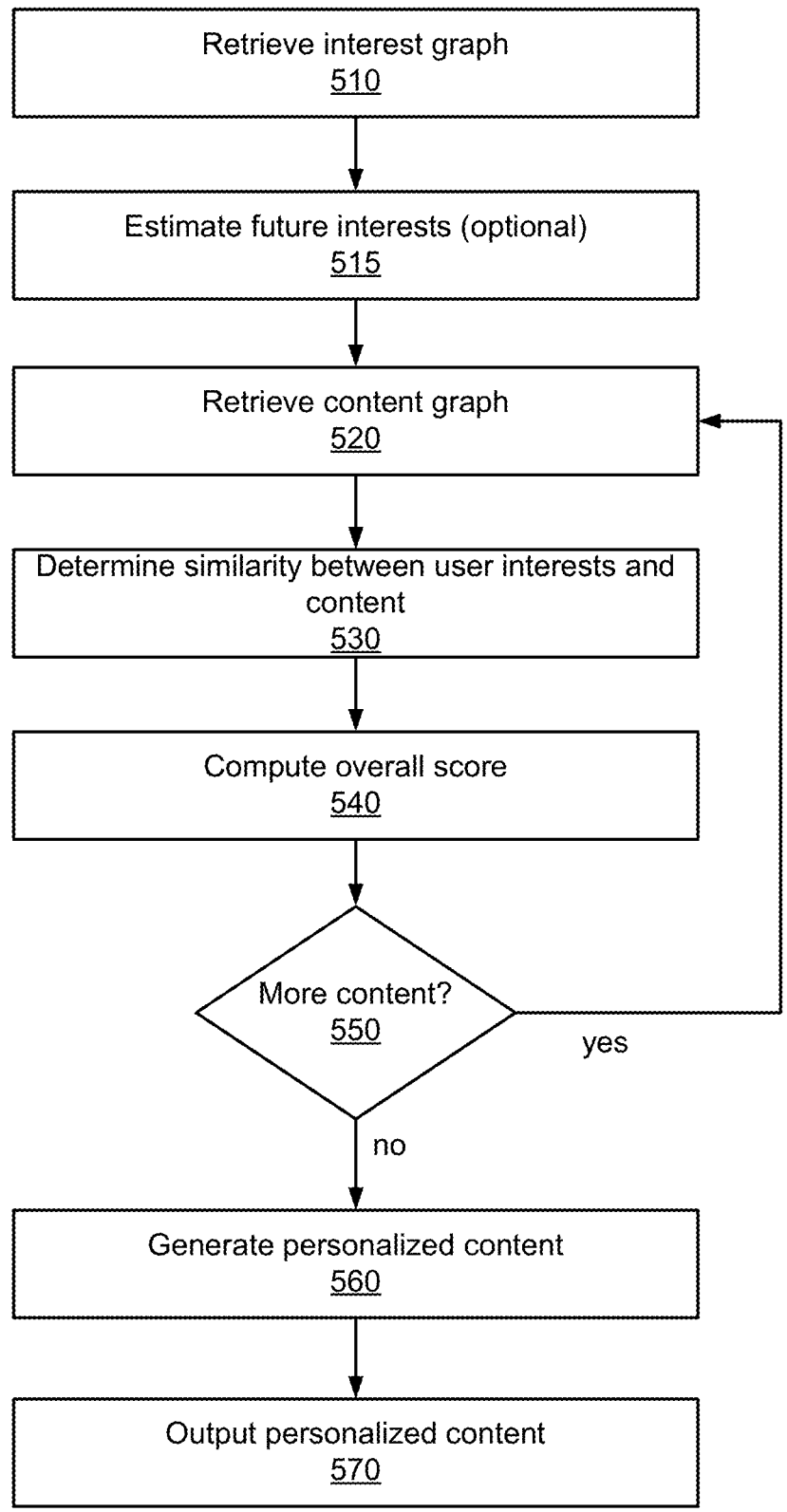
FIG. 5 illustrates one embodiment of a method for generating personalized content from a user's interests according to an embodiment.

FIG. 5 illustrates one embodiment of a method for generating personalized content from a user's interests, according to an embodiment. In an embodiment, the steps depicted in the method shown in FIG. 5 are implemented by instructions for performing the described actions embodied or stored within the machine-readable medium 122, such as the main memory 104 or the storage unit 116 memory, which are executable by the processor 102. Those of skill in the art will recognize that the method may be implemented in embodiments of hardware and/or software or combinations thereof. Those of skill in the art will recognize that other embodiments can perform the steps of FIG. 5 in different orders or include different and/or additional steps than the ones described herein.

Generally speaking, the system generates personalized content for a user of the content delivery system 200 that is likely to be relevant to the user's interests. Initially, the system retrieves 510 the interest graph for a particular user of the content delivery system 200. In one embodiment, the user's interest graph is retrieved 510 in response to a user identifier received by the system or in response to a request to generate personalized content for a particular user.

As previously described, the interest graph represents the user's interests through the user's attachment level to one or more topics in the user's interest graph. In one embodiment, the interest graph includes information about the user's current attachment to various topics as well as the user's historical attachment levels. In one embodiment, the system also estimates 515 the user's future interests from the user's interest graph and the interest graphs of other users. Estimating 515 the user's future interests allows delivery of content based not only on the user's current interests, but also on the user's future interests. Estimating a user's future interests is further described by reference to FIGS. 6-9.

The system also retrieves 520 a content graph from the plurality of content graphs 260 generated for content 280. As previously described, each content graph includes information about the topics associated with a piece of content 280. Each content graph also includes a virality score that represents the popularity of the piece of content.

The system determines 520 the level of similarity between the user's interests (i.e., current or future interests) and the content associated with the content graph. In one embodiment, system compares the user's interest graph to the content graph and computes an interest score that represents the similarity between the user's interests and the content. For example, the interest score may be computed with the following formula:

$$InterestScore = \sum_{i=0}^{N} Attachment_i \times Confidence_i$$

In this formula, InterestScore is the interest score. N is the number of topics in the user's interest graph. Attachment is the user's attachment to a particular topic in the user's interest graph. Confidence represents the confidence score for the same topic in the content graph. Thus, for each topic in the user's interest graph, the system combines the user's attachment to the topic with a corresponding confidence score from the content graph. The result is an interest score that represents the similarity between the user's interests and the content.

In another embodiment, determining 520 the similarity between a user's interests and the content comprises identifying a broader topic that links the topics in the content graph together. For example, the content graph may include the topics "surfing" and "wakeboarding". Both topics may be sub-topics of the broader topic of "extreme sports," as determined by examining the relationship between the topics in the ontology 250. The broader topic is compared to the topics in the user's interest graph (or a broader topic determined from the topics in the interest graph) to compute an interest score that represents the similarity between the user's interests and the content.

Using the interest score and virality score, the system subsequently computes 540 an overall score for the content. For example, the overall score may be equal to a multiple of a weighted interest score and a weighted virality score. The overall score represents the relevancy of the content based on the user's interests as well as the popularity of the content. In other embodiments, the overall score is also affected by other factors such as the source of the content (e.g., the website that the content is hosted on), the time since the content was first published, how a user's friends on social networks have interacted with the content (via liking or sharing the content), etc. If more content 550 is available, steps 520-540 are repeated.

Repeating steps 520-540 generates a plurality of overall scores for a plurality of content.

The system then uses the overall scores to generate 560 personalized content for the user. In one embodiment, generating 560 personalized content comprises generating a recommendation for content. For example, the personalized content may be a list of hyperlinks to content, where the hyperlinks are ordered from highest overall score to lowest overall score.

In one embodiment, generating 560 personalized content comprises generating personalized content that actually includes the content itself. For example, the personalized content may include the text of several news articles that have high overall scores. In one embodiment, pieces of content with overall scores that exceed a threshold are used to generate personalized content for the user. The threshold may be an absolute threshold (e.g., above some pre-defined score) or a relative threshold (e.g., above the $90^{th}$ percentile). The personalized content is then output 570 for presentation to the user.

In one specific embodiment, the system generates a personalized newsfeed for a user. The system receives a plurality of news articles through an RSS feed, such as an article about sports, an article about music, an article about politics, and an article about the weather. The system determines one or more topics for each of the articles, as well as the current popularity of each article. The system compares a user's interest graph against the articles to identify the articles that the user is most interested in. Based on the user's interest in the articles and the popularity of the articles, the most important articles are used to generate a personalized newsfeed that is output to the user.

The disclosed embodiments thus provide a method for determining the content that is most relevant to a user of the content delivery system 200. By leveraging the user's own interests and the popularity of the content, the system 200 can accurately determine and generate content that is personalized to the interests of each individual user.

Estimating Future Interests

In one embodiment, the system estimates 515 a user's future interests from a user's interest graph and the interest graphs of other users, which can be used to generate personalized content for the user. As discussed previously, the personalized content system stores interest graphs for a plurality of users. In one embodiment, each interest graph represents a user's current and historical interests through attachment levels to one or more topics. A user's attachment to different topics is not static and will change over time as the user performs actions that update the user's interest graph. Trends in attachment levels and relationships between topics are captured in the plurality of interest graphs, which can be used to predict a user's future interests. Future interests generally refers to either interests in new topics that the user currently has no attachment to, or changing interests in existing topics that the user already has an attachment to.

Figure 6:
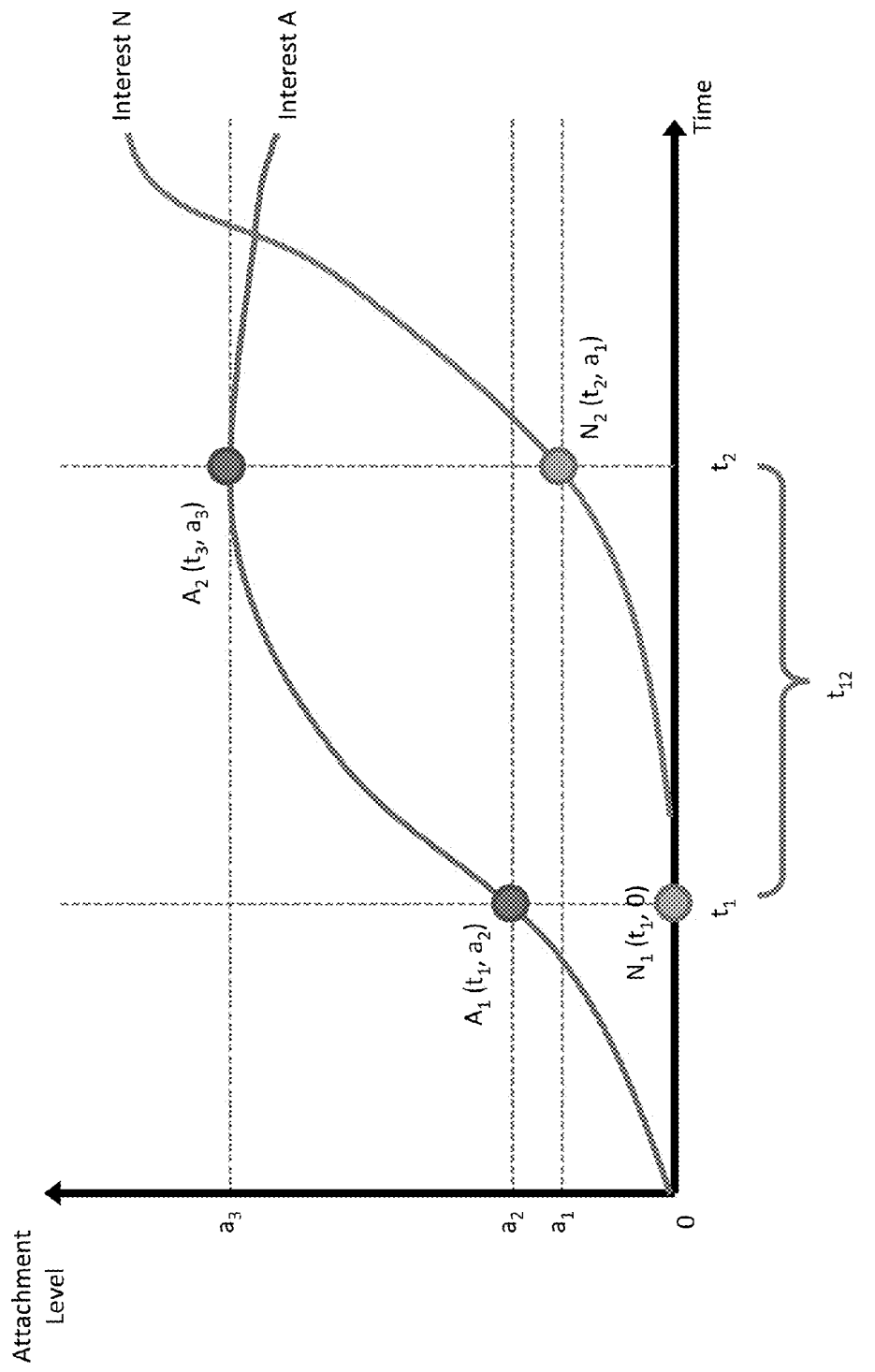
FIG. 6 illustrates an example interest graph showing a user's attachment to different topics over time.

FIG. 6 illustrates an example interest graph showing a user's attachment to different topics over time. For purposes of illustration, FIG. 6 shows a user's attachment to interest A and interest N over time. As shown in FIG. 6, at different times, an attachment level is associated with each topic, indicating the user's interest in that topic at a particular time. For example, at time $t_1$, the user has an attachment to interest A that is quantified as $a_2$, while at time $t_2$, the user has an attachment to interest A that is quantified as $a_3$. Similarly, at time $t_1$, the user has an attachment of 0 to topic N, while at time $t_2$ the user has an attachment of $a_1$ to interest N. In an embodiment, a rate of change of attachment values is determined from the interest graph to determine changes in the attachment value over time. For example, an instantaneous velocity is calculated to determine how an interest value changes over time or an acceleration is calculated to determine how rapidly the velocity changes over time.

As shown in FIG. 6, examination of the interest graph provides information of how a user's interest in a topic changes over time, and also allows identification of different topics in which a user may become interested. For example, the interest graph shown in FIG. 6 shows how the user's interest in interest N increases over time so that the user is eventually more interest in interest N than in interest A. This information allows a system to provide the user with content related to interest N at an earlier point in time by identifying the user's changing interest level.

Figure 7:
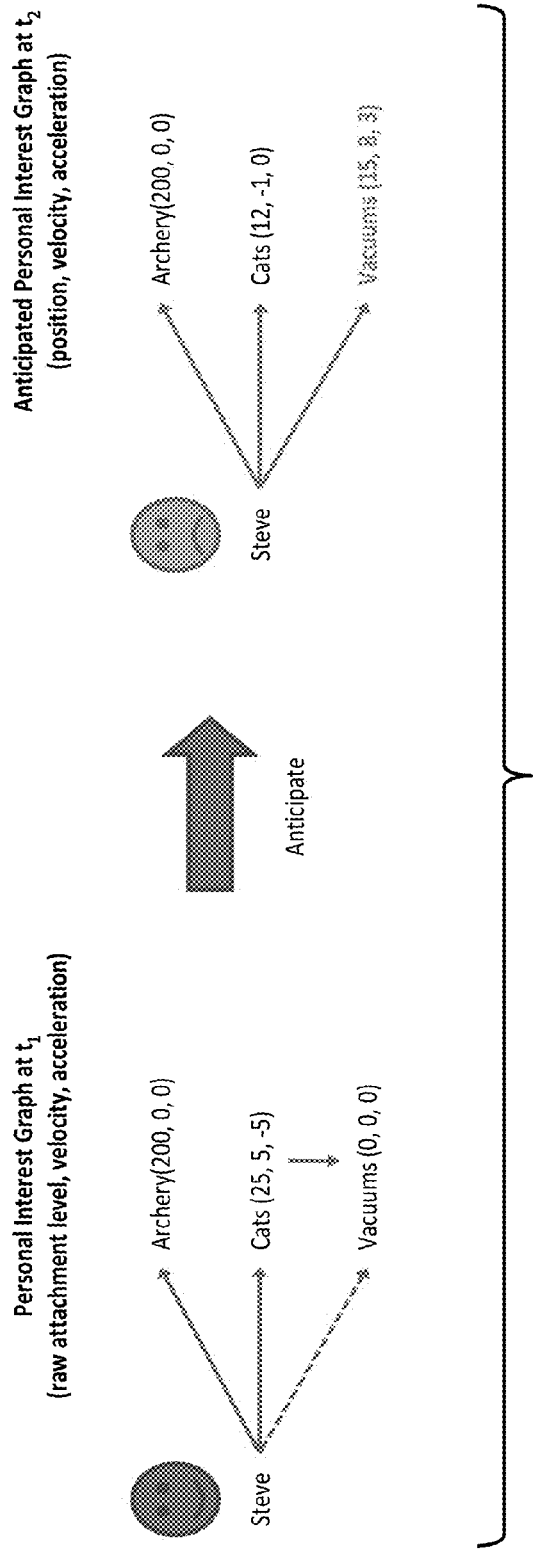
FIG. 7 illustrates an example of predicting a user's future interests based on data from an interest graph.

FIG. 7 illustrates an example of predicting a user's future interests based on data from an interest graph. In the example shown by FIG. 7, at time $t_1$, an interest graph associated with the user Steve is accessed to determine Steve's interest in different topics. In the example of FIG. 7, at time $t_1$, Steve has an attachment level of 200 for the topic Archery, an attachment level of 25 for the topic Cats and an attachment level of 0 for the topic Vacuums. In FIG. 7, additional data is retrieved from the interest graph associated with Steve. For example, at time $t_1$, the velocity of Steve's attachment to Archery is zero and the acceleration of Steve's interest in Archery is also zero. Similarly, at time $t_1$, the velocity of Steve's attachment to Cats is 5 and the acceleration of Steve's interest in Cats is −5. At time $t_1$, the velocity of Steve's attachment to Vacuums is 0, as is the acceleration of Steve's interest in Vacuums.

By accessing interest graphs associated with other users, or historical data about Steve's interests, inferences about Steve's future interests are made. For example, by accessing historical data from other users having similar interests, inferences of Steve's interests at a later time interval are made. In the example of FIG. 7, historical data from other users and data from Steve's interest graph is used to predict that at time $t_2$ Steve has an attachment level of 200 to Archery, an attachment level of 12 to Cats and an attachment level of 15 to Vacuums. Based on this prediction, Steve is exposed to content relating to Vacuums prior to time $t_2$. Hence, the interest graph associated with a user and interest graphs associated with additional users allow prediction of the user's interests at a future time, enabling customization of content presented to the user that reflects the user's predicted future interests. This allows a user to receive earlier exposure to topics that the user is likely to be interested in during a future time interval. Further, based on this prediction, Steve's exposure to contents associated with Cats can be reduced. This allows a user to receive reduced exposure to a topic when it is expected that the interest in the topic will wane.

Figure 8:
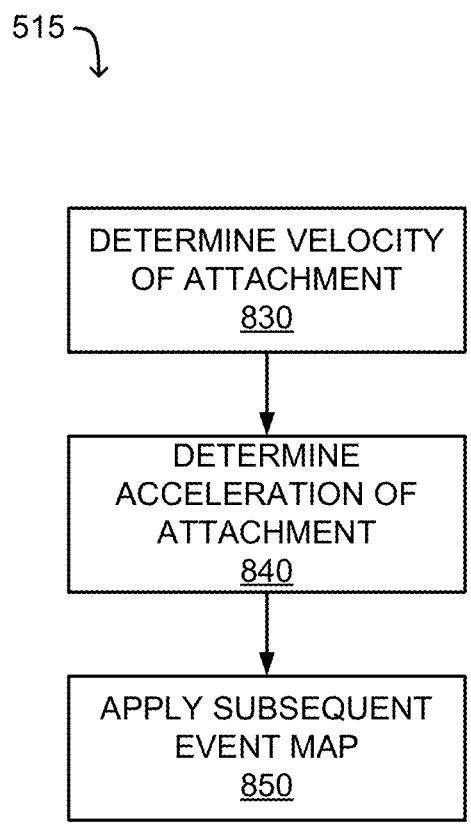
FIG. 8 illustrates one embodiment of a method for estimating a user's future interests.

FIG. 8 illustrates one embodiment of a method performed for estimating 515 a user's future interests. In an embodiment, the steps depicted in the method shown in FIG. 8 are implemented by instructions for performing the described actions embodied or stored within the machine-readable medium 122, such as the main memory 104 or the storage unit 116 memory, which are executable by the processor 102. Those of skill in the art will recognize that the method may be implemented in embodiments of hardware and/or software or combinations thereof. Those of skill in the art will recognize that other embodiments can perform the steps of FIG. 8 in different orders or include different and/or additional steps than the ones described herein.

As explained above by reference to FIG. 5, in a prior step, the system 230 retrieves 510 an interest graph associated with a user. The interest graph may include data of the user's attachment level to topics in the interest graph both at the current time and in the past.

The velocity of attachment values associated with one or more topics is determined 830 from the interest graph. The velocity indicates how the attachment level associated with a topic changes over time. For example, the attachment level associated with a topic at an earlier time, $t_0$, is determined and an attachment level associated with the topic at the current time, $t_1$, is determined and the velocity of the attachment value is determined by calculating the difference between the attachment level at $t_0$ and the attachment level at $t_1$ then dividing the difference by the time difference from $t_0$ to $t_1$, so that attachment velocity=(attachment at $t_1$−attachment at $t_0$)/($t_0$−$t_1$). By determining 830 the velocity of an attachment value, a determination of whether a user is becoming more interested or less interested in a topic is possible. For example, a positive velocity indicates that the user is becoming more interested in a topic while a negative velocity indicates that the user is becoming less interested in a topic. Additionally, determining 830 the velocity of an attachment value indicates how rapidly a user's interest in a topic is changing over time.

In one embodiment, the acceleration of attachment values associated with one or more topics is determined 840 from the interest graph. The acceleration indicates how rapidly a user's interest in a topic is changing by describing the rate of change of the velocity of an attachment value. Determining 840 the acceleration of an attachment value provides additional data about how a user's interest in a topic changes over time, providing additional information for determining the user's likely future interests.

To estimate a user's future interest in new topics, a subsequent event map is applied 850 to the attachment value, velocity and acceleration obtained from the interest graph. The subsequent event map includes historical data describing changes in attachment to the topic or related topic obtained from other users. By aggregating how the attachment levels of different users change over time, the subsequent event map enables estimation of a future attachment level to a new topic based on historical data acquired from additional users. For example, the attachment level and attachment velocity of a user at a first time interval indicates that the user has an increasing attachment to a first topic. Applying 850 the subsequent event map indicates that other users with a similar attachment level that is increasing also have a have a high attachment to a second topic at a second time interval. Hence, prior to the second time interval, content, such as news articles, advertisements, links to data sources or informational messages, associated with the second topic is presented to the user, allowing a user to receive information about the second topic at an earlier time.

Figure 9:
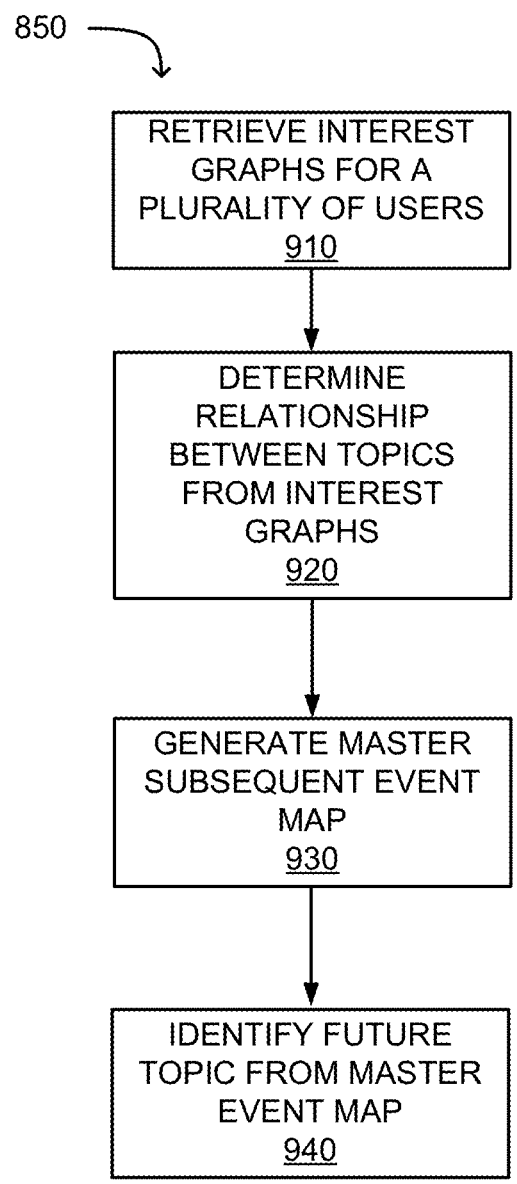
FIG. 9 illustrates one embodiment of a method for applying a subsequent event map to estimate a user's future interests.

FIG. 9 illustrates one embodiment of a method applying 850 a subsequent event map to estimate a user's future interests. In an embodiment, the steps depicted in the method shown in FIG. 9 are implemented by instructions for performing the described actions embodied or stored within the machine-readable medium 122, such as the main memory 104 or the storage unit 116 memory, which are executable by the processor 102. Those of skill in the art will recognize that the method may be implemented in embodiments of hardware and/or software or combinations thereof. Those of skill in the art will recognize that other embodiments can perform the steps of FIG. 9 in different orders or include different and/or additional steps than the ones described herein.

To determine the subsequent event map, interest graphs associated with a plurality of additional users are retrieved

910. For example, interest graphs associated with other users are retrieved 910 to obtain information about the behavior of other users over time.

Relationships between different topics are determined 920 from the retrieved interest graphs. In one embodiment, intersection points between topics are identified from the interest graphs, and topics that intersect are determined 920 to be related. In another embodiment, topics having attachment levels that change relative to each other are identified as related, such as interest in a first topic increasing while interest in a second topic also increases. For example, the interest graphs can be analyzed statistically as a group to determine that an increasing interest in a first topic is typically followed by a new and increasing interest in a second topic. In an embodiment, relationships between topics are determined 920 by generating pairs of topics from each retrieved interest graph and retrieving attachment values for the pairs of topics from the retrieved interest graphs.

Based on the relationship between topics from the retrieved interest graphs, attachment values from the retrieved interest maps are combined to generate 930 a master subsequent event map. The master subsequent event map aggregates attachment data from the retrieved interest graphs, so that changes in attachment levels from multiple users are represented by the master subsequent event map. Hence, the master subsequent event map quantifies the relationship between multiple topics over time based on changes in attachment levels of multiple users. The user's attachment level, velocity, and acceleration to different topics are then compared against the master subsequent event map to identify 940 future topics of interest. For example, the master subsequent event map may indicate that users with an increasing interest in cats soon have a new and increasing interest in vacuums. Thus, if the user has an increasing interest in cats, vacuums are identified 940 as a future topic of interest.

Referring back to FIG. 8, in one embodiment, to estimate a user's future interest in a topic that the user already has an attachment to, a subsequent event map is not applied 850. Instead, a similar but slightly different process is followed. Interest graphs for a plurality of users are retrieved. The user's historical attachment to the topic is then compared to the same topic in the plurality of interest graphs to identify a similar pattern of activity. From the pattern of activity in these matching interest graphs, a future level of attachment is determined for the topic. For example, a user's interest graph may indicate that the user's interest in surfing was increasing at $t_1$, decelerated at time $t_2$ and leveled off at time $t_3$. This topic and pattern of activity is located in other interest graphs. Other interest graphs show that users having this same pattern of attachment for surfing will typically have a continued interest in surfing at time $t_4$. This is an indication that the user has picked up a new hobby that the user is likely to continue. Thus, it is estimated that at a future time, the user's interest in surfing will be remain unchanged. As another example, a user's interest graph may indicate that the user's interest in batteries surged from zero at time $t_1$ to a high level at time $t_2$. Other interest graphs show that a surging interest in car batteries is typically followed by a quick and steep decline in interest at time $t_3$. This is an indication that users who need car batteries typically lose their interest once they get the car battery. Thus, by analyzing the plurality of interest graphs, it is determined that at a future time, the user's interest in batteries will disappear.

Maintaining an interest graph associated with a user allows monitoring of the user's interest in various topics over time. Data describing changes in a user's interests allow modification of content presented to a user to reflect topics in which the user is currently interested. Additionally, maintaining interest graphs for multiple users provides historical data of how the interest of different users in topics changes over time, allowing prediction of future user interests (i.e. new topics or changing attachment levels in existing topics). Extracting data from an individual user's interest graph and comparing the extracted data to data aggregated from multiple users' interest graphs allows prediction of the individual user's future interests based on changes in the interest of other users over time. This interest prediction allows presentation of content in which a user is interested at an earlier time.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, the processes described with respect to FIGS. 2-9. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory), for example, the processes described with respect to FIGS. 2-9. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating personalized content. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method comprising:
   receiving information about an action performed by a user, wherein the action comprises at least one of creating or interacting with first content, the user associated with an interest graph stored in a machine readable medium and representative of interests of the user in a plurality of topics;
   analyzing language of the first content to identify lexical features of the first content;
   determining a topic of the first content based on the lexical features of the first content; and
   updating the interest graph stored in the machine readable medium to modify an attachment level in the interest graph representing an interest of the user in the topic of the first content.

2. The method of claim 1, wherein determining a topic of the first content based on the lexical features of the first content comprises:
   comparing the lexical features of the first content to stored lexical features,
      wherein the stored lexical features are associated with one or more topics; and
   determining the topic of the first content based on the comparison.

3. The method of claim 1, wherein determining a topic of the first content based on the lexical features of the first content further comprises:
   determining a topic of the first content based on the lexical features of the first content and the interest graph associated with the user.

4. The method of claim 1, wherein determining a topic of the first content based on the lexical features of the first content comprises:
   determining a confidence score for the topic of the first content, and
   wherein updating the interest graph comprises modifying the attachment level by an amount that is based on the confidence score.

5. The method of claim 1, wherein updating the interest graph comprises modifying the attachment level based on a type of the received action.

6. The method of claim 1, further comprising
   extracting the first content into a normalized format and wherein analyzing language of the first content to identify lexical features of the first content comprises analyzing language of the normalized format of the first content.

7. The method of claim 1, further comprising
   generating content for the user based on the interest graph associated with the user.

8. The method of claim 7, wherein generating content for the user comprises:
   generating a content recommendation for the user based on the interest graph associated with the user.

9. The method of claim 7, further comprising
   obtaining second content;
   analyzing language of the second content to identify lexical features of the second content;
   determining one or more topics of the second content based on the lexical features of the second content; and
   determining a similarity between the interests of the user as indicated by the interest graph and the one or more topics of the second content;
   wherein the content for the user is generated based on the determined similarity between the interests of the user and the one or more topics of the second content.

10. The method of claim 9, wherein determining one or more topics of the second content comprises:
   comparing the lexical features of the second content to stored lexical features, wherein each of the stored lexical features is associated with one or more topics; and
   determining one or more topics of the second content based on the comparison.

11. The method of claim 9, further comprising:
   determining a popularity of the second content, and
   wherein the content for the user is generated based on the determined popularity of the second content and the determined similarity between the interests of the user and the one or more topics of the second content.

12. The method of claim 9, further comprising:
   predicting future interests of the user based on the interests of the user as indicated by the interest graph and historical interests of other users, and
   wherein determining a similarity comprises determining a similarity between the predicted future interests of the user and the one or more topics of the second content.

13. A computer program product comprising a non-transitory computer-readable medium containing computer program code for performing the method comprising:
   receiving information about an action performed by a user, wherein the action comprises at least one of creating or interacting with first content, the user associated with an interest graph and representative of interests of the user in a plurality of topics;
   analyzing language of the first content to identify lexical features of the first content;
   determining a topic of the first content based on the lexical features of the first content; and
   updating the interest graph to modify an attachment level in the interest graph representing an interest of the user in the topic of the first content.

14. The computer program product of claim 13, wherein determining a topic of the first content based on the lexical features of the first content comprises:
   comparing the lexical features of the first content to stored lexical features, wherein the stored lexical features are associated with one or more topics; and
   determining the topic of the first content based on the comparison.

15. The computer program product of claim 13, wherein determining a topic of the first content based on the lexical features of the first content further comprises:
   determining a topic of the first content based on the lexical features of the first content and the interest graph associated with the user.

16. The computer program product of claim 13, further comprising
   generating content for the user based on the interest graph associated with the user.

17. The computer program product of claim 16, further comprising
obtaining second content;
analyzing language of the second content to identify lexical features of the second content;
determining one or more topics of the second content based on the lexical features of the second content; and
determining a similarity between the interests of the user as indicated by the interest graph and the one or more topics of the second content;
wherein the content for the user is generated based on the determined similarity between the interests of the user and the one or more topics of the second content.

18. The computer program product of claim 16, wherein generating content for the user comprises:
generating a content recommendation for the user based on the interest graph associated with the user.

* * * * *